United States Patent [19]

Argyris et al.

[11] 4,337,795
[45] Jul. 6, 1982

[54] SINGLE LEVER MIXING FAUCET

[75] Inventors: Pericles A. Argyris; William R. Williams, both of Morgantown, W. Va.

[73] Assignee: Sterling Faucet Company, Schaumburg, Ill.

[21] Appl. No.: 572,397

[22] Filed: Apr. 28, 1975

[51] Int. Cl.³ ............................................ F16K 11/02
[52] U.S. Cl. ........................... 137/625.17; 137/636.2; 137/119
[58] Field of Search ............. 137/625.17, 636.2, 636.3, 137/636.4, 119, 315

[56] References Cited

U.S. PATENT DOCUMENTS

| Re. 25,954 | 2/1966  | Klingler    | 137/625.17 |
|------------|---------|-------------|------------|
| 2,949,933  | 8/1960  | Moen        | 137/625.17 |
| 3,643,697  | 2/1972  | Staat       | 137/625.17 |
| 3,773,079  | 11/1973 | Moen        | 137/625.17 |
| 3,807,453  | 4/1974  | Dom et al.  | 137/625.17 |

Primary Examiner—William R. Cline
Attorney, Agent, or Firm—Leydig, Voit, Osann, Mayer & Holt, Ltd.

[57] ABSTRACT

A single lever mixing faucet is comprised of a body having a through bore in which a spindle is mounted for rotary and axial movement, a pivot member rotatably mounted on the body on which is pivoted an operating handle one end of which engages the upper end of the spindle so that upon pivotal motion of the handle in a vertical plane the spindle is moved between open and closed positions and upon rotary motion of the pivot member the spindle is rotated between hot and cold positions. The pivot member also provides stop means to limit the vertical movement of the spindle in either direction and serves as a retainer for a cover member which encloses at least a portion of the body. The cover member has an access opening and may be rotated to position the opening opposite either of two spring pressed seats in the hot and cold inlet ports. The spindle has an elongated chamber within it and passages in the spindle walls establish communication between the chamber and the inlets. The chamber opens to the exterior at the bottom of the spindle where means are provided to connect a spray attachment to the chamber within the spindle. A one-way valve allows flow of fluid from the chamber to the spray attachment but prevents reverse flow.

12 Claims, 7 Drawing Figures

SINGLE LEVER MIXING FAUCET

BACKGROUND OF THE INVENTION

The invention herein described relates to improvements in single lever mixing faucets of the type shown in U.S. Pat. No. 3,807,453 and it particularly relates to a pivot member which has the multiple functions of providing means to mount an operating handle for rotating the spindle of the faucet and moving it axially as well as for providing axial stops for the spindle member and to function as a hold down for the cover surrounding the body of the faucet. In the aforementioned patent two shell-like elements are joined together to form a cup-shaped member which is rotatably mounted on the exterior of the faucet body. The operating handle is pivoted within the cup member and has one end in pivotal engagement with the end of the spindle, whereby the handle may be operated to raise and lower the spindle and to rotate it between hot and cold positions. However, the arrangement therein shown comprises a relatively large number of parts, is relatively complicated and expensive to manufacture and assemble and does not perform the stop function of the invention herein.

Other pertinent prior art are the patents to Klinger U.S. Pat. Nos. 3,561,485 and Re. 25,954. In both of these patents a mounting head is rotatably mounted on what may be said to be a body member and on which an operating handle is pivoted, one end of the operating handle engaging the end of a spindle whereby upon manipulation of the handle the spindle may be rotatably positioned between hot and cold positions and axially positioned between open and closed positions. In neither case, however, does the head member perform the additional stop and hold down functions of the invention herein disclosed.

U.S. Pat. No. 3,807,453 also shows a relatively complicated arrangement which includes a back pressure valve located in the spout to connect a spray attachment to the mixing chamber of the valve. In contrast, the instant invention provides direct communication between spray attachment and the mixing chamber within the spindle, no differential pressure valves being employed. Also a direct and simple means to gain access to the seal members is provided.

SUMMARY AND OBJECT OF THE INVENTION

Accordingly, it is a primary object of the invention to provide a mixing valve embodying a multiple function pivot member which mounts an operating handle in such a fashion whereby the faucet spindle may be moved axially as well as in rotary direction and provides means to limit the axial motion of spindle.

Another object of the invention is to provide a mixing faucet embodying a pivot member which mounts an operating handle in a manner to impart axial and rotary movement to the spindle and which pivot member also provides means to retain a cover member within which the body of the faucet is enclosed.

It is another object of the invention to provide a mixing valve faucet having a relatively uncomplicated and inexpensive means to mount the operating handle in cooperative relationship to the faucet spindle.

It is another object of the invention to provide a pivot member for a mixing faucet on which pivot member is mounted the operating handle and which is readily assembled and removable from the faucet assembly.

It is a further object of the invention to provide an uncomplicated and economic means of connecting a spray attachment to the mixing chamber of the faucet.

A still further object is to provide a direct, convenient and inexpensive means to provide access to the seals.

These and other objects of the invention will appear as the description thereof progresses.

DESCRIPTION OF THE PREFERRED EMBODIMENT

Figure 1:
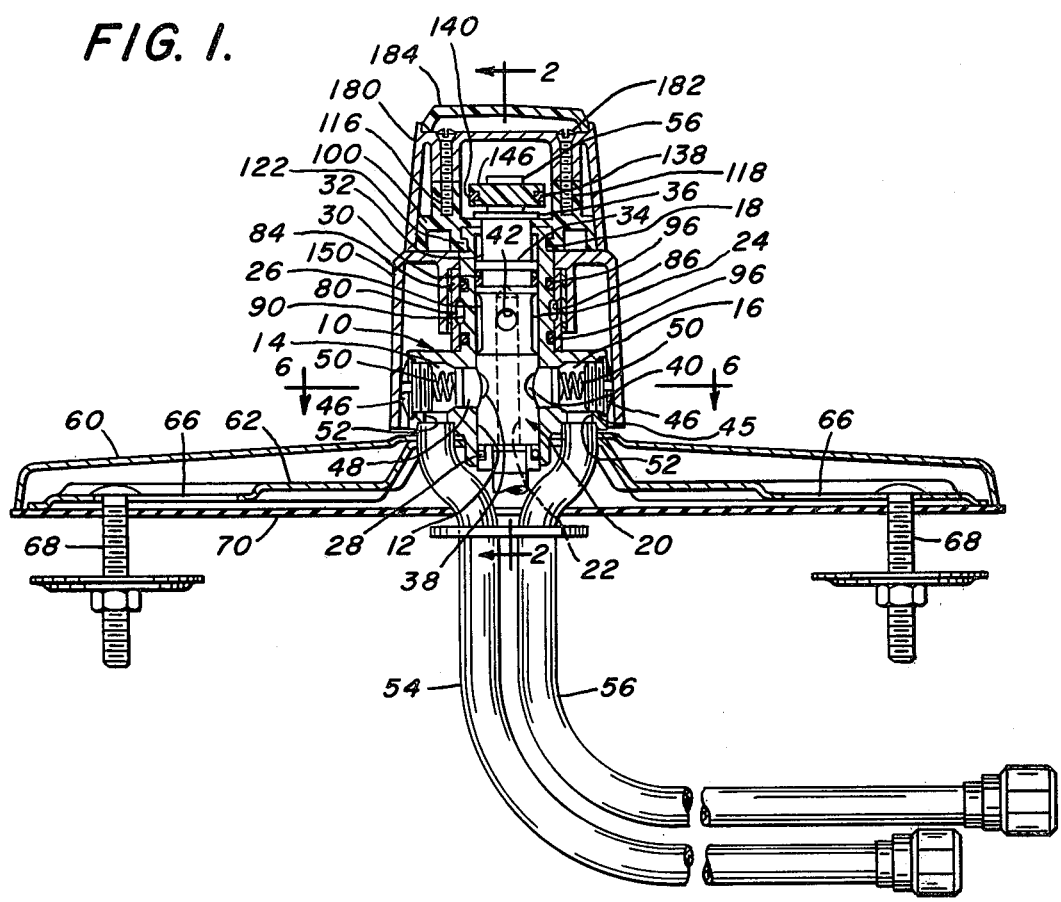
FIG. 1 is a front elevation view in section of the mixing valve embodying the instant invention.
Figure 2:
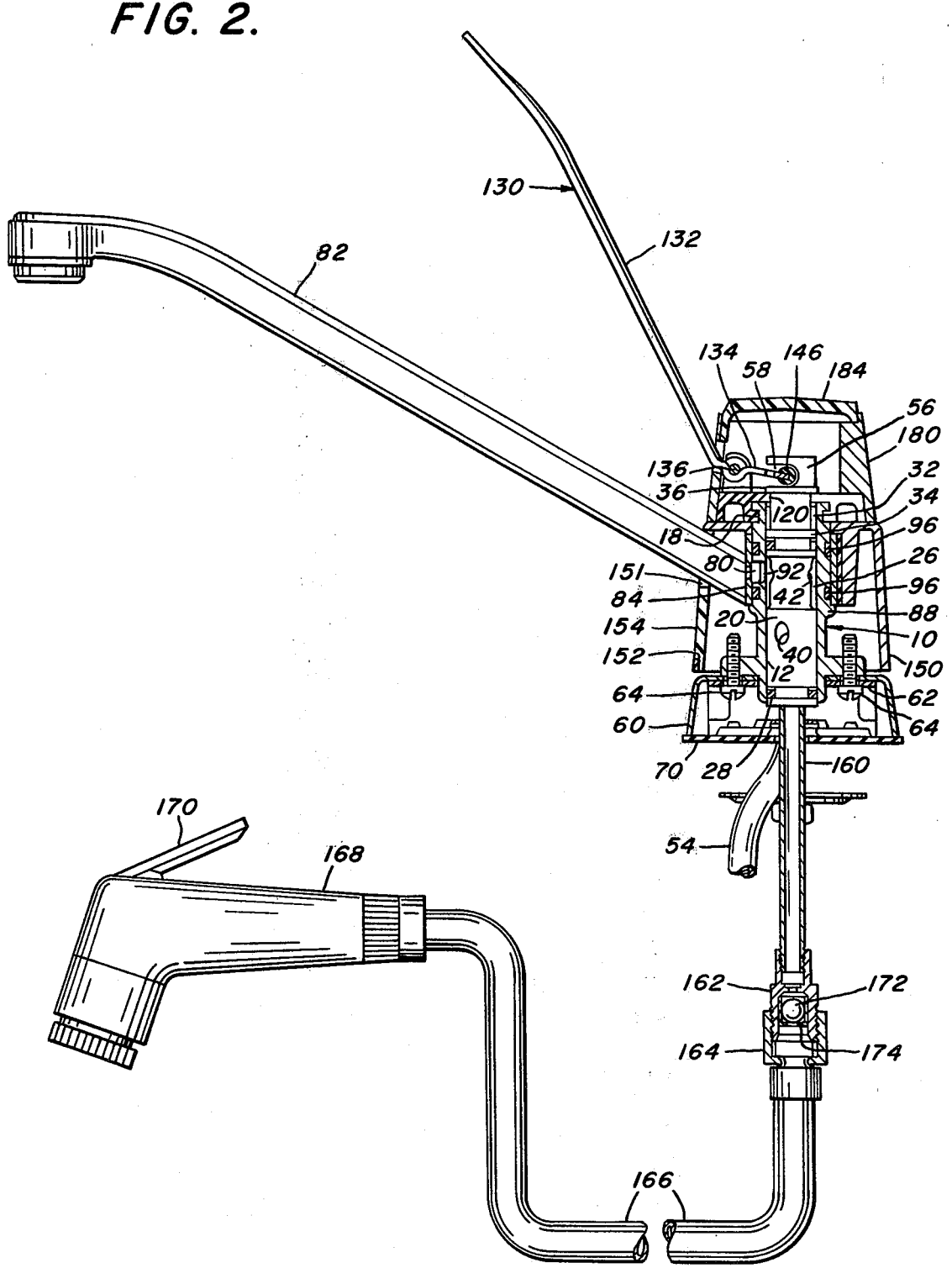
FIG. 2 is a side elevation view in section taken along the lines 2—2 of FIG. 1.

Referring particularly to FIGS. 1 and 2 a body member 10 having a generally inverted T-configuration has a through bore 12 and radial hot and cold inlet ports 14 and 16 respectively intersecting with through bore 12. Annular groove 18 (FIG. 2) is formed on the exterior surface of body 10 near its upper extremity for a purpose which will hereinafter appear.

Figure 7:
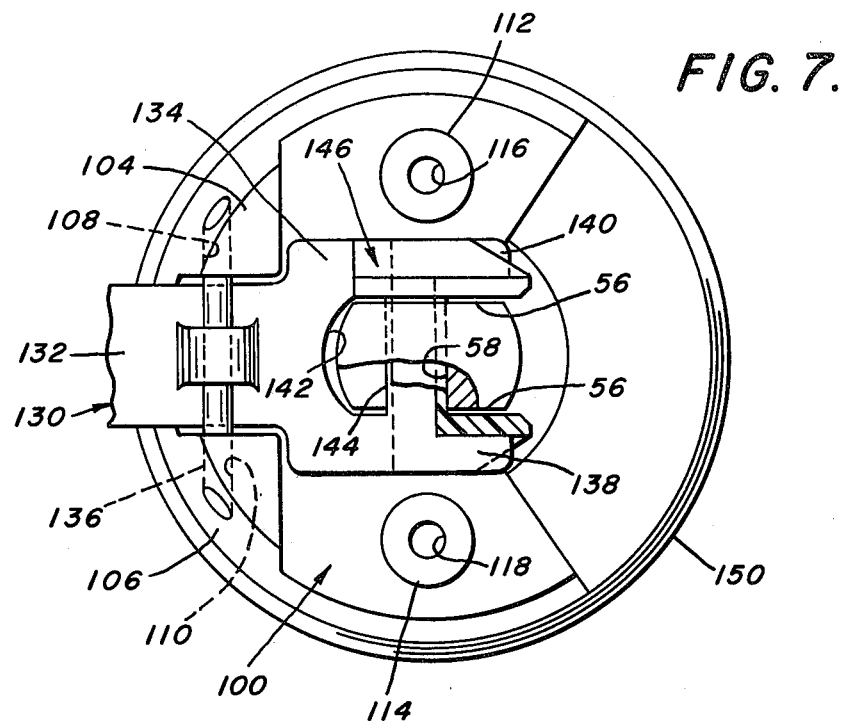
FIG. 7 is a top plan view of FIG. 2 with the cover removed to show the pivot member, handle, body and spindle.

Spindle 20 is mounted for both rotary and axial movement in bore 12. A mixing chamber 22 within spindle 20 is comprised of a bind bore closed at its upper end but opening to the exterior of the spindle at the lower end of the spindle. Reduced section 24 on spindle 20 together with the interior of bore 12 defines an annular chamber 26. Annular seal ring 28 at the lower end of spindle 20 prevents leakage of fluid between the body and spindle at the lower end thereof and seal ring 30 prevents leakage from chamber 26 axially outward therefrom. Near the upper end of spindle 20 a reduced section 32 provides axially spaced abutment shoulders 34 and 36. As best shown in FIGS. 1 and 7 flats 56 are formed on either side of the upper extremity of spindle 20, and as best shown in FIG. 2 a radially open jaw 58 is formed in the portion of the spindle having flats 56.

Figure 6:
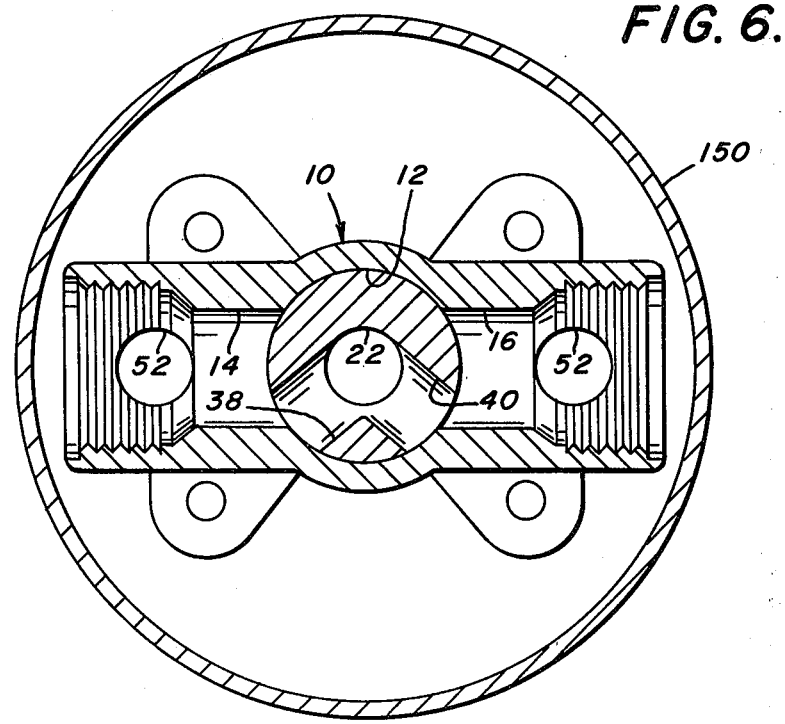
FIG. 6 is a cross sectional view taken along the line 6—6 of FIG. 1.

As best shown in FIG. 6 radial passages 38 and 40 intersect chamber 22 and serve to connect chamber 22 with hot and cold inlet passages 14 and 16 respectively when the faucet is in the open position shown in FIG. 1. As shown there the faucet is in the full open position and is centered approximately halfway between the full hot and the full cold positions so that the water mixture within chamber 22 will be approximately equal proportions of hot and cold. Passage 42 in the side wall of the spindle 20 establishes communication between chamber 22 and chamber 26.

The open outer ends of radial inlet passages 14 and 16 are closed by screws 46 and annual seal rings 45. Within the inlet and outlet passages resilient cylindrical seal members 48 are spring pressed against the outer cylindrical surface of spindle 20 by means of springs 50 which are compressed between screws 46 and the outer ends of sealing members 48. Passages 52 connect inlets 14 and 16 respectively with supply tubes 54 and 56 which are soldered to the bottom of body 10.

A housing 60 is clamped between the bottom of body 10 and mounting plate 62 which is secured with respect to the bottom of body 10 by means of screws 64 (FIG. 2). Slots 66 are provided at either end of mounting plate 62 through which pass the bolts of bolt-nut-washer assemblies 68 for securing the faucet to the top of a kitchen sink (not shown) in a well known manner. Gasket 70 is clamped between the bottom of cover 66 and the top of the sink when the faucet is secured in place.

A spout assembly is comprised of a spout portion 82 and a cylindrical ring portion 84 which has formed on its inner surface an annular groove 86. Ring portion 84 is rotatably received on body 10 and is vertically supported thereon by annular abutment 88 formed on body. When so received on the body annular groove 86 in ring portion 84, together with annular groove 90 formed on the exterior of body 10 defines an annular chamber 80 around the exterior of body 10. Port 92 (FIG. 2) connect chamber 26 to chamber 80 and port 94 in ring portion 84 connects chamber 80 with the passage formed in the interior of the spout portion 82. Whereby chamber 26 is connected to the interior of spout member 82 in all rotated positions thereof. Resilient annular seal members 96 on either side of chamber 80 prevent leakage of fluid between the ring portion 84 and the body 10.

Figure 3:
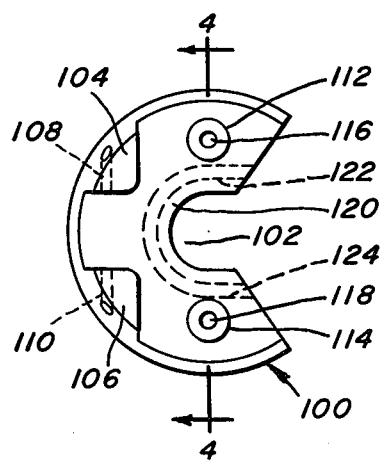
FIG. 3 is a top plan view of the pivot member of the instant invention.
Figure 4:
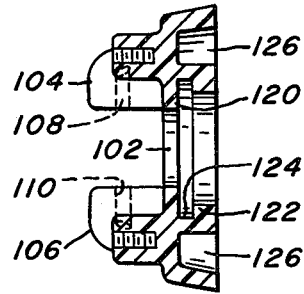
FIG. 4 is a cross sectional view taken along the lines 4—4 of FIG. 3.
Figure 5:
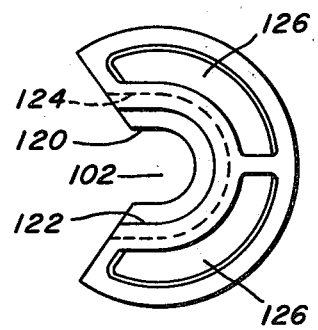
FIG. 5 is a bottom plan view of the pivot member shown in FIG. 3.

FIGS. 3, 4 and 5 show a handle mount and pivot member indicated generally by the numeral 100. As viewed from above as shown in FIG. 3 pivot member 100 is generaly of a c-shaped configuration having a central opening 102. A shown in FIGS. 3 and 4, bosses 104 and 106 project upwardly from the top of the pivot member and have aligned bores 108 and 110 respectively formed therein. Bosses 112 and 114 also project upwardly from the top of pivot member 100 and each have blind tapped vertical bores 116 and 118 for the reception of screws for mounting a cap thereon as will hereinafter will be described. As best shown in FIG. 4 annular horseshoe-shaped ribs 120 and 122 are formed on pivot member 100 bordering opening 102 to provide therebetween a similarly shaped open ended groove 124. Arcuately shaped recesses 126 are formed in the bottom of the pivot member 100 in the interests of economy of material.

An operating handle 130 (FIGS. 2 and 7) comprised of arm 132 and arm 134 and is pivotally mounted on pivot member 100 between bosses 104 and 106 by means of a pin 136 received in bores 108 and 110. Arm 134 is relatively short and has forwardly extending arms 138 and 140 and an opening 142 which forms a cross arm 144 extending between the roots of arms 138 and 140. Arms 138 and 140 and cross arm 144 are covered with a nylon bearing sheath 146. In assembly, the subassembly comprised of the pivot member 100 and the operating handle 130 is mounted on the body 10 by inserting the legs of rib 122 into groove 18 from the side of body member 10. As this subassembly is mounted on the body from the side of the body, the nylon sheathed cross arm 144 will be received into the radially open slot 58 in the end of the spindle 20 and the nylon sheathed arms 138 and 140 will embrace the flat portions 56 at the end of the spindle. Thus the entire subassembly of the operating handle 130 and pivot member 100 is mounted on the body 10 for rotation about the axis of spindle 20.

As shown in FIGS. 1 and 2 the spindle 20 is in the full open position with the ports 38 and 40 centered halfway between the full hot and the full cold position. In this position the water in the chamber 22 will be comprised of substantially equal amounts of hot and cold water. In order to vary this proportion the operating handle 130 may be manipulated to rotate the pivot member and because of the snug fitting relationship between the nylon sheathed arms 138 and 140 and the flat portion 56 of the spindle 20, the spindle will be rotated to further uncover the hot or cold inlet to produce the desired temperature of water flowing out of the spout. In order to shut off the valve or to reduce the rate of flow the operating handle 130 is depressed which because of the snug fit of the nylon sheathed cross arm 144 in jaw 58 causes the spindle 20 to be raised to any desired position to either partially throttle the water passing into the chamber 22 or to raise the spindle sufficiently to the point where the passages 38 and 40 are closed off by sealing engagement between seals 48 and the outer cylindrical surface of plunger 20.

It will be noted that when the pivot member 130 is mounted on the body as shown in FIGS. 1 and 2, rib 120 party overlies the bore 12 in body 10. The upper limit of vertical travel of the spindle 20 is defined by the engagement of the annular abutment shoulder 34 and the lower surface of rib 120. The lower limit of vertical travel of the spindle is fixed by the abutment of the annular abutment shoulder 36 against the upper surface of rib 120. Thus the rib 120 provides a stop defining both the upper and lower limits of travel of the spindle 20.

In assembly of the faucet, before the pivot member 100 is mounted on the body 10 a cover 150 having an opening 152 in the side wall thereof to accommodate the spout 182 is inserted over the body 10 in such a manner that it is supported by ring portion 84. Pivot member 100 is then mounted on the body member 10 and as shown in FIGS. 1 and 2 serves to fix the cover 150 against vertical movement in the assembly, while allowing rotation of the cover with the spout 82 and ring 84 relative to the body 10 cover 60 and pivot member 100. The cover 150 may therefore be rotated to a position where opening 152 permits access to screws 46 and seals 48 whenever seal examination or replacement is desired. A snap-in insert 154 is provided to close opening 152 beneath the spout 82 at all other times.

Open ended conical shaped cap 180 is secured to the top of pivot member 100 by means of screws 182 threaded into bosses 116 and 118 (FIG. 1) and serves to prevent the pivot member from becoming disengaged from annular groove 18. Snap-in insert 184 closes the opening in the top of cap 180. Thus the entire assembly comprised of the spindle 20, pivot member 100, cap 180, and insert 184 rotates as the handle assembly 130 is rotated.

A hollow tube 160 has one end threaded into the bottom of spindle 20 so that the interior of the tube 160 communicates with chamber 22. At the other end of the hollow tube 160 a fitting 162 is threaded thereon which fitting is adapted for threaded connection with a female fitting 164 of a spray attachment. A flexible hose 166 extends between the fitting 164 to a spray head assembly 168 which contains a shut off valve interiorly thereof the operation of which is controlled by lever 170. The details of the construction and operation of the spray head 168 and the lever 170 is well known in the art and comprises no part of the invention herein. Within fitting 162 is a one-way ball check 172 which is loosely retained within the interior of fitting 162 by means of a support wire 174. In the operation of the spray attachment to the spindle 20 is positioned in the open position as shown in FIGS. 1 and 2 so that chamber 22 is connected to the inlets 14 and 16. When lever 170 is operated to open the valve within spray head 168, water will then flow from chamber 22 through tube 160, hose 166 and out the spray head 168 at the same time while it is flowing from chamber 22 through chamber 26 and out the spout 82. The purpose of the one-way ball check 172 is to prevent reverse flow of water from the spray head back into the chamber 22 and into the water mains which could take place under certain circumstances. For example, if the spray head were left immersed in water in the sink and the pressure in the water mains dropped sufficiently, in the event of a malfunction of the valve within the spray head, without the one-way ball check 172, by means of a siphoning action liquid would be returned from the sink into the water mains, thus causing possible contamination of the water supply. The one-way ball check 172 prevents such a reverse flow while allowing the flow of water in the direction from the faucet to the spray head.

Thus, the invention herein provides a unique, inexpensive and effective means to mount the operating handle for pivotable motion in a vertical plane and rotary motion about the axis of rotation of the spindle, whereby the spindle may be operated in a rotary direction as well as an axial direction the mounting means additionally providing means to limit the axial motion of the spindle in either direction as well as performing a retaining function to retain the cover of the faucet in position in the assembly. Also a unique, direct and convenient means is provided to give access to the seals for servicing and repair thereof; also provided is a simple direct and effective method and apparatus of supplying water pressure to a conventional spray head.

I claim:

1. A mixing faucet comprising a body having a through bore, hot and cold inlet ports in said body communicating with said bore, an outlet port communicating with said bore, a spindle mounted in said bore for rotary movement between hot and cold positions and for axial movement between open and closed positions, a pivot member rotatably mounted on the upper portion of said body, an operating handle pivotally mounted on said pivot member, a portion of said handle being operatively connected with the upper end of said spindle whereby upon pivotal movement of said handle in a vertical plane said spindle is moved axially between open and closed positions and upon rotary movement of said pivot member in a horizontal plane said spindle is moved between said hot and cold positions, means on said pivot member adapted to cooperate with means on said spindle to limit the axial movement of said spindle in both directions.

2. The faucet of claim 1, together with a cover mounted on said body beneath said pivot member and enclosing at least a portion of said body, said pivot member being adapted to retain said cover against upward vertical movement.

3. The faucet of claim 1, an annular groove formed in said body adjacent its upper end, said pivot member being of generally C-shaped configuration and having a central opening therethrough and a mounting rib surrounding said opening adjacent the lower surface of said pivot member, said rib being adapted to be inserted into said annular groove.

4. The faucet of claim 3 in which said spindle has an end portion with flats formed on either side thereof and a radially open jaw formed in said end portion, a jaw engaging portion on said handle received in said jaw and spaced arms embracing said end portion of said spindle when said rib is inserted into said annular groove on said body to mount said pivot member on said body whereby upon manipulation of said handle in a vertical plane said jaw engaging portion cooperates with said jaw to move said spindle vertically and upon rotary manipulation of said operating handle said arms cooperate with the flats on said end portion to rotate said spindle.

5. The faucet of claim 3 in which a radially open jaw is formed on the upper end of said spindle, a jaw engaging portion on said handle received in said jaw when said rib is inserted into said groove to mount said pivot member on said body whereby upon manipulation of said handle in a vertical plane said jaw engaging portion cooperates with said jaw to move said spindle in a vertical direction.

6. The faucet of claim 5 together with cooperating means on said handle and the upper end of said spindle for non-rotatable engagement therebetween whereby upon rotation of said handle and said pivot member said spindle will be rotated therewith, said cooperating means comprising flat portions formed on said upper end of said spindle and arms formed on said handle adapted to embrace said flat portions.

7. A mixing faucet comprising a body having a through bore, hot and cold inlet ports and an outlet port in said body communicating with said bore, a spindle mounted in said bore for rotary movement between hot and cold positions and for axial movement between open and closed positions, a unitary pivot member rotatably mounted on the upper portion of said body, cooperating means respectively on said body and said pivot member to permit said pivot member to be mounted on said body by movement of said pivot member solely in a direction perpendicular to the axis of rotation of said spindle, an operating handle pivotally mounted on said pivot member, cooperating means respectively on said handle and the upper end of said spindle to permit engagement of a portion of said handle with said upper end of said spindle when said pivot member is mounted on said body.

8. The faucet of claim 7 in which said last mentioned cooperating means comprises a radially opening jaw on said upper end of said spindle and jaw engaging means on said portion of said handle whereby upon pivotal operation of said handle said spindle will be moved vertically between open and closed positions.

9. The faucet of claim 7 in which said last mentioned cooperating means comprises flat portions formed on said upper end of said spindle and arms extending from said portion of said handle and embracing said flat portions whereby upon rotation of said pivot member and said handle said spindle will be rotated between hot and cold positions.

10. A faucet comprising a body having a through bore, a spindle mounted in said bore for rotary and axial movement therein, hot and cold inlet ports in said body formed radially of said bore the inner ends of said ports communicating with said bore, the outer ends of said ports opening to the exterior of said body, seal members having passages therethrough in said inlet ports resiliently biased into contact with said spindle, a cover member enclosing at least a portion of said body including said ports and mounted for rotation on said body, a spout rotatably mounted on said body and projecting through an opening in said cover, an access opening in said cover, said cover being rotatable upon rotation of said spout to position said opening opposite either of said ports upon rotation of said spout to provide access to either of said ports and said seal members.

11. The faucet of claim 10 together with removable closure means adapted to close said access opening when access to either of said ports is not desired.

12. For use in a faucet comprising a body having a through bore in which a spindle is mounted for axial and rotary movement and having an annular groove formed exteriorly thereof near its upper end, the improvement comprising a pivot member of general C-shaped configuration comprising a radially open central opening extending therethrough, a horizontally disposed lower rib circumscribing said opening and adapted for insertion into said groove on said body from the side of said body to rotatably mount said pivot member on said body, and an upper rib adapted to coact with means or said spindle to limit the axial movement of thereof in either direction.

* * * * *